(12) United States Patent
Gadre

(10) Patent No.: US 8,365,622 B2
(45) Date of Patent: Feb. 5, 2013

(54) REVERSE CHAIN DRIVE FOR MOTOR VEHICLE TRANSMISSIONS

(75) Inventor: Ashish V. Gadre, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 474 days.

(21) Appl. No.: 12/506,032

(22) Filed: Jul. 20, 2009

(65) Prior Publication Data
US 2011/0011194 A1    Jan. 20, 2011

(51) Int. Cl.
*F16H 3/08* (2006.01)
(52) U.S. Cl. ........................................................ 74/330
(58) Field of Classification Search ............... 74/330
See application file for complete search history.

(56) References Cited

U.S. PATENT DOCUMENTS

| | | | |
|---|---|---|---|
| 839,512 A * | 12/1906 | Robinson | 74/358 |
| 1,250,546 A * | 12/1917 | Blydenburgh | 74/375 |
| 4,515,031 A * | 5/1985 | Janson | 74/359 |
| 5,280,731 A * | 1/1994 | Turpin | 74/358 |
| 6,427,550 B1 * | 8/2002 | Bowen | 74/336 R |
| 6,637,283 B2 * | 10/2003 | Belloso | 74/342 |
| 7,083,540 B2 * | 8/2006 | Janson et al. | 475/211 |
| 7,462,121 B2 * | 12/2008 | Janson et al. | 475/5 |
| 7,765,886 B2 * | 8/2010 | Hori et al. | 74/343 |
| 2004/0149080 A1 * | 8/2004 | Pollak | 74/661 |

* cited by examiner

*Primary Examiner* — Ha D. Ho

(57) ABSTRACT

Reverse gear for a motor vehicle transmission is achieved through a chain assembly having two sprockets and a multi-link chain. One of the sprockets is coupled to a clutch which selectively connects it to an input or output shaft. The other sprocket is directly coupled to the other, i.e., output or input shaft. The multi-link chain carries drive torque from the input shaft to the output shaft when the clutch is engaged. Because the other driving connections between the input shaft and the output shaft associated with the forward gears or gear ratios are through gears which cause a reversal of rotational direction, the driving connection achieved by the chain assembly, without a directional reversal, is, in fact, opposite in direction to the rotational direction of the forward gears, thereby providing reverse.

20 Claims, 2 Drawing Sheets

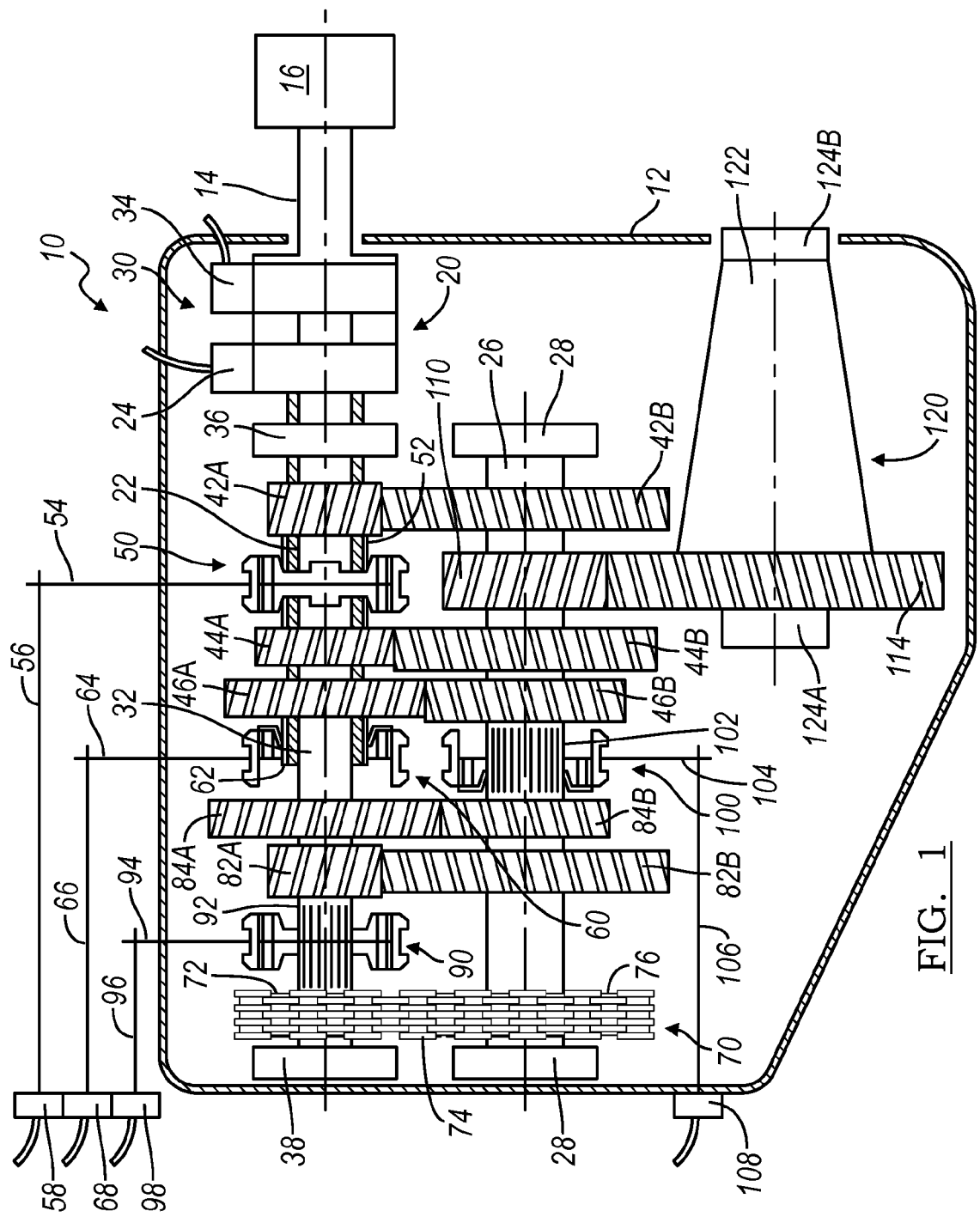

REVERSE CHAIN DRIVE FOR MOTOR VEHICLE TRANSMISSIONS

FIELD

The present disclosure relates to motor vehicle transmissions and more particularly to motor vehicle transmissions having a chain drive assembly which provides reverse.

BACKGROUND

The statements in this section merely provide background information related to the present disclosure and may or may not constitute prior art.

In most manual, semi-automatic and automatic motor vehicle transmissions, forward speed ratios (gears) are achieved by selectively engaged pairs of gears or planetary gear sets. Reverse gear is generally achieved by incorporating an additional, direction reversing idler gear between a pair of gears, causing the transmission output to rotate on the opposite direction relative to all the other selected gears or gear ratios.

This reverse idler, although standard transmission design practice, is not without its drawbacks. First of all, it necessitates at least one component on an additional axis, offset form the axis or axes of the transmission shafts. Although the reverse idler gear on the additional axis is generally not large, it may still present transmission and driveline packaging issues. Clearly, the transmission housing must be configured to not only accept the reverse gear idler but also accommodate a supporting shaft. Second of all, the reverse idler gear, of course, requires the shaft with suitable bearings, all components that add weight and cost to the transmission. Last of all, the conventional reverse idler gear train can be noisy and creates significant parasitic losses due to the multiple gear meshes. It is apparent that improvements in transmission reverse gear configurations are therefore desirable.

SUMMARY

The present invention provides reverse gear for motor vehicle transmissions through the agency of a chain assembly having two sprockets and a multiple link chain. One of the sprockets is coupled to a synchronizer clutch which selectively connects it to an input or output shaft. The other sprocket is coupled to the other, i.e., output or input shaft. The multi-link chain carries drive torque from the input or drive shaft to the output shaft or countershaft when the synchronizer clutch is engaged. Because the driving connections between the input shaft and the output shaft associated with the forward gears or gear ratios are through gears which cause a reversal of rotational direction, the driving connection achieved by the chain assembly, although without a directional reversal, is, in fact, opposite in direction to the rotational direction of the forward gears, thereby providing reverse.

The reverse chain drive assembly of the present invention is quieter, is more compact and has lower parasitic losses than the reverse idler gear configuration of conventional motor vehicle transmissions.

Thus it is an object of the present invention to provide reverse gear in a motor vehicle transmission without the use of an additional idler gear.

It is a further object of the present invention to provide reverse gear in a motor vehicle transmission through the agency of a chain assembly.

It is a still further object of the present invention to provide reverse gear in a motor vehicle transmission with a chain assembly operably disposed between an input shaft and an output shaft.

It is a still further object of the present invention to provide reverse gear in a motor vehicle transmission through the agency of a chain assembly and clutch operably disposed between an input shaft and an output shaft.

It is a still further object of the present invention to provide reverse gear in a motor vehicle transmission through the agency of a chain assembly having two sprockets and a chain and clutch.

It is a still further object of the present invention to provide reverse gear in a motor vehicle transmission with a chain assembly having two sprockets and a chain and clutch operably disposed between shafts of the transmission.

It is a still further object of the present invention to provide reverse gear in a manual, semi-automatic or automatic motor vehicle transmission with a chain assembly having two sprockets and a chain and clutch operably disposed between shafts of the transmission.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a diagrammatic view of a dual clutch transmission for a motor vehicle incorporating the present invention;

DETAILED DESCRIPTION

Figure 3B:
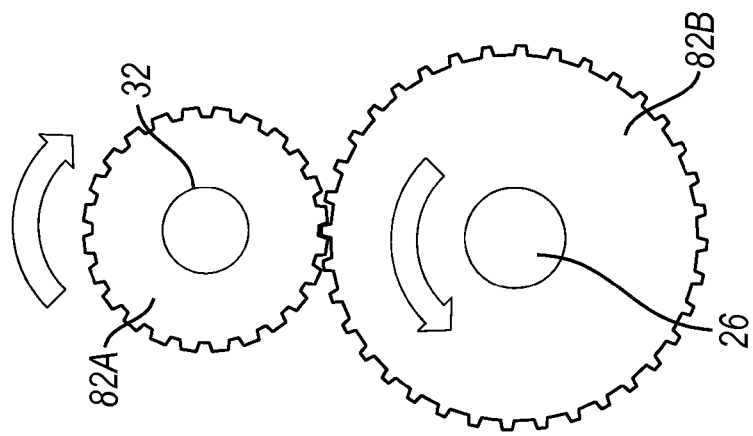
FIGS. 3A and 3B are schematic diagrams of the relative rotation of torque transfer through the chain drive assembly of the present invention (FIG. 3A) and through a pair of meshing gears (FIG. 3B).

The following description is merely exemplary in nature and is not intended to limit the present disclosure, application, or uses.

With reference to FIG. 1, a five-speed, dual clutch transmission is illustrated and generally designated by the reference number 10. The transmission 10 is representative of other multiple-speed dual clutch transmissions as well as manual transmissions and many automatic transmissions wherein reverse gear was, in the past, provided by a reverse idler gear that, because it increased the number of gears meshes, typically from one to two (or two to three), reversed the direction of the transmission output when it was engaged.

The transmission 10 includes a housing 12 having various openings, ports, counterbores, shoulders, flanges and the like which receive, locate and support various components of the transmission 10. Among these components is an input or drive shaft 14 which receives drive torque from a prime mover 16 such as a gasoline or Diesel engine or hybrid power plant (all not illustrated). Connected to the input shaft 14 is the input or driven side of a first input friction clutch 20. The output or drive side of the first friction clutch 20 is coupled to and drives a first drive tube or quill 22. A first electric, hydraulic or pneumatic operator 24 engages and releases the first friction clutch 20. The first friction clutch 20 preferably includes two sets of interleaved plates or discs having friction facing (clutch) material. One of the sets of plates or discs (the input side) is connected to the input shaft 14; the other set of plates or discs (the output side) is connected to the first drive tube or quill 22.

A driven layshaft or countershaft 26 is disposed along a second axis parallel to and spaced from the axis of the input shaft 14. The countershaft 26 is rotatably supported on a pair of bearings 28. Adjacent the first input friction clutch 20 is a second input friction clutch 30 which also has its input or driven side connected to the input shaft 14. The output or drive side of the second friction clutch 30 is coupled to and drives a second drive shaft 32. A second electric, hydraulic or pneumatic operator 34 engages and releases the second friction clutch 30. The second input friction clutch 30 is of the same configuration as the first friction clutch 20 described above. A pair of bearings 36 and 38 rotatably support the first drive tube or quill 22 and the second drive shaft 32, respectively.

About the first drive tube or quill 22, there are freely rotatably disposed three spur or preferably helical gears corresponding to first, third and fifth gears of the transmission 10 which are each in constant mesh with a respective one of another three gears secured to and rotating with the countershaft 26. A first, smallest diameter drive gear 42A is in constant mesh with a first, largest diameter driven gear 42B. The pair of gears 42A and 42B provides first gear, i.e., the gear ratio with the highest speed reduction. Spaced from the first gear 42A is a third, intermediate diameter drive gear 44A which is in constant mesh with a third, intermediate diameter driven gear 44B. The pair of gears 44A and 44B provides third gear, i.e., the gear ratio with the third highest speed reduction. Adjacent the third, intermediate gear 44A is a fifth, largest diameter drive gear 46A which is in constant mesh with a fifth, smallest diameter driven gear 46B. The pair of gears 46A and 46B provides fifth gear, the highest speed (lowest gear ratio) of the transmission 10. The terms "largest" and "smallest" as used herein describe gear diameters relative to other gear diameters on the same shaft. In fact, the gears 46A and 46B may be the same size, thereby providing direct (1:1) drive or the fifth drive gear 46A may have a larger diameter than the fifth driven gear 46B, thereby providing overdrive, i.e., a speed increase.

Disposed on the first drive tube or quill 22 between the first drive gear 42A and the third drive gear 44A is a first double synchronizer clutch assembly 50. The first double synchronizer clutch assembly 50 as well as the other synchronizer clutch assemblies include synchronizers and face or dog clutch components that first synchronize and then positively engage an adjacent gear(s) to an associated shaft in accordance with conventional practice. The first double synchronizer clutch 50 is coupled to the first drive tube or quill 22 by interengaging splines 52, rotates therewith and translates axially and bi-directionally thereby synchronizing and engaging either the first drive gear 42A or the third drive gear 44A to the first drive tube or quill 22. The first double synchronizer clutch assembly 50 is engaged and translated by a first shift fork 54 which is coupled to a first shift rail 56. The first shift rail 56 is bi-directionally translated by a first electric, hydraulic or pneumatic shift actuator 58.

Disposed on the first drive tube or quill 22 adjacent the fifth drive gear 46A is a first single synchronizer clutch assembly 60. The first single synchronizer clutch assembly 60 is coupled to the first drive tube or quill 22 by interengaging splines 62, rotates therewith and translates axially and bi-directionally to synchronize and engage the fifth drive gear 46A to the first drive tube or quill 22. The first single synchronizer clutch assembly 60 is engaged and translated by a second shift fork 64 which is coupled to a second shift rail 66. The second shift rail 66 is bi-directionally translated by a second electric, hydraulic or pneumatic shift actuator 68.

Figure 2:
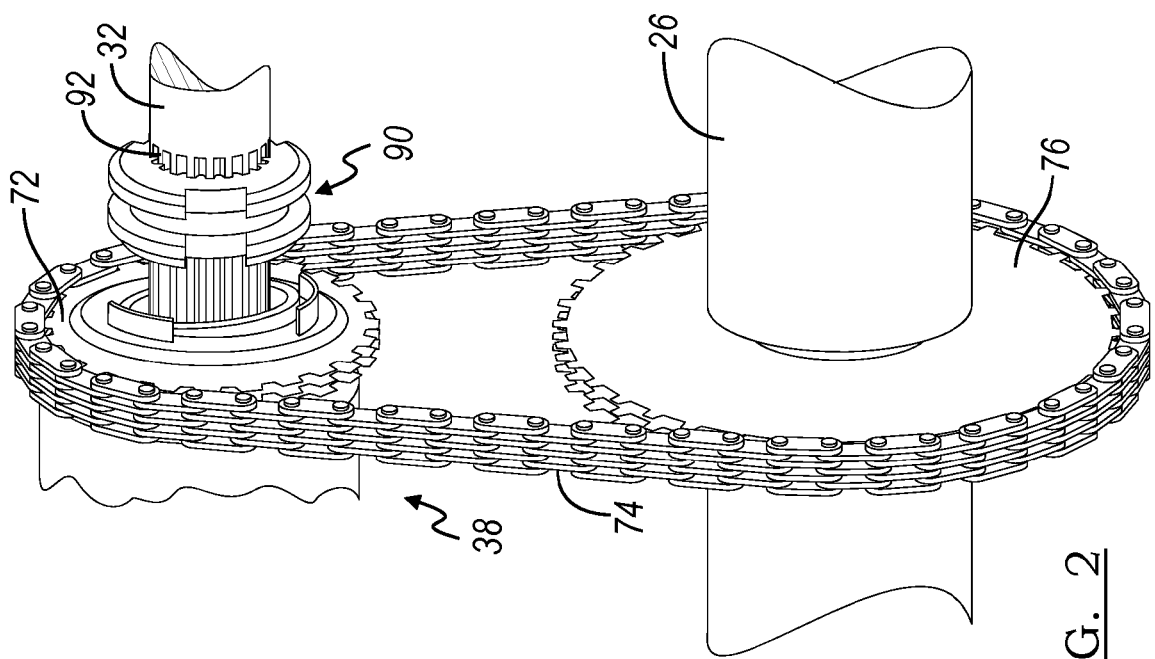
FIG. 2 is a fragmentary perspective view of a reverse chain drive assembly according to the present invention.

Referring now to FIGS. 1 and 2 and returning to the left side of the transmission 10 and the second drive shaft 32, it will be appreciated that the configuration of components is significantly different than that on the right side of the transmission 10. First of all, and adjacent the bearing 38, is a chain drive assembly 70 having a chain drive sprocket 72 freely rotatably disposed about the second drive shaft 32. A multiple link chain 74 extends about a portion of the chain drive sprocket 72 and also extends about a portion of a driven chain sprocket 76 which is secured to and rotates with the countershaft 26. Depending upon the configuration of the transmission 10, either the chain drive sprocket 72 or the driven chain sprocket 76 (or both) may reside at least partially in the oil sump (not illustrated) in the lower portion of the transmission housing 12. Thus, splash lubrication may readily be provided to the multiple link chain 74 and the sprockets 72 and 76.

Spaced from the chain drive sprocket 72 is a second, intermediate diameter drive gear 82A which is in constant mesh with a second, intermediate diameter driven gear 82B secured to and rotating with the countershaft 26. The pair of second gears 82A and 82B provides second gear, i.e., the second highest speed reduction. Adjacent the second, intermediate diameter drive gear 82A is a fourth, intermediate diameter drive gear 84A that is secured to and rotates with the second drive shaft 32. The fourth, intermediate diameter drive gear 84A is in constant mesh with a fourth, intermediate diameter driven gear 84B which is freely rotatably disposed on the countershaft 26. The pair of fourth gears 84A and 84B provides fourth gear, i.e., the fourth highest speed reduction achieved by the transmission 10.

Disposed on the second drive shaft 32 between the chain drive sprocket 72 and the second drive gear 82A is a second double synchronizer clutch assembly 90. The second double synchronizer clutch assembly 90 is coupled to the second drive shaft 32 by interengaging splines 92, rotates therewith and translates axially and bi-directionally thereby synchronizing either the chain drive sprocket 72 or the second drive gear 82A to the second driveshaft 32. The second double synchronizer clutch 90 is engaged and translated by a third shift fork 94 which is coupled to a third shift rail 96. The third shift rail 96 is bi-directionally translated by a third electric, hydraulic or pneumatic shift actuator 98.

Disposed on the layshaft or countershaft 26 adjacent the fourth driven gear 84B is a second single synchronizer clutch assembly 100. The second single synchronizer clutch assembly 100 is coupled to the countershaft 26 by interengaging splines 102, rotates therewith and translates axially and bi-directionally to synchronize and engage the fourth driven gear 84B to the countershaft 26. The second single synchronizer clutch assembly 100 is engaged and translated by a fourth shift fork 104 which is coupled to a fourth shift rail 106. The fourth shift rail 106 is bi-directionally translated by a fourth electric, hydraulic or pneumatic shift actuator 108.

Secured to and rotating with the layshaft or countershaft 26 is an output drive gear 110 which is in constant mesh with and drives an input gear 114 of a final drive assembly 120. The final drive assembly 120 typically includes a differential 122 which drives a pair of outputs 124A and 124B. Alternatively, the input gear 114 may be coupled to and drive a propeller shaft (not illustrated) which, in turn, is coupled to and drives a remote final drive assembly 120.

With regard to operation of the transmission 10, inasmuch as the operation of the conventional components has been generally described above and further that those skilled in the transmission art will understand the operation of the conventional components of the transmission 10, they will not be further described. Attention will thus focus on the second drive shaft 32, the second double synchronizer clutch assembly 90, the chain drive assembly 70 and the second drive and driven gears 82A and 82B. It should be appreciated that second gear has been chosen for this explanation because it utilizes the same synchronizer clutch assembly 90 as reverse and thus somewhat simplifies said explanation. From the standpoint of forward and reverse rotational output, however, any forward gear and reverse will demonstrate operation of the invention.

When second gear (provided by the gears 82A and 82B) is selected, the third electric, hydraulic or pneumatic shift actuator 98 is activated to move the third shift rail 96 and the third shift fork 94 to the right as illustrated in FIG. 1 to synchronize and engage the second drive gear 82A with and to the second, drive shaft 32. When this action has been completed, the second friction clutch 30 is energized to engage the input shaft 14 with the second drive shaft 32. Drive torque is thus provided through the input shaft 14, the second friction clutch 30, the second drive shaft 32, the gears 82A and 82B, the countershaft 26, the gears 110 and 114 and the final drive assembly 120. It should be noted that in this case, as well as with all other forward gears or gear ratios, the torque travels through two gear meshes and thus the direction of output rotation is the same as the direction of input rotation.

To select reverse, a similar sequence of events occurs except that the third shift actuator 98 is activated to move the third shift rail 96 and the third shift fork 94 to the left as illustrated in FIG. 1, to synchronize and engage the chain drive sprocket 72 with the second drive shaft 32. When this action is complete, the second friction clutch 30 is energized to engage the input shaft 14 with the second drive shaft 32. Drive torque is thus provided through the input shaft 14, the second friction clutch 30, the second drive shaft 32, the chain sprockets 72 and 76, the chain 74, the countershaft 26, the gears 110 and 114 and the final drive assembly 120. So achieved, the countershaft 26 and the associated output assembly rotates in the opposite direction from the example given above regarding second gear, since there is no reversal of the direction of rotation between the input shaft 14 and the countershaft 26.

Figure 3A:
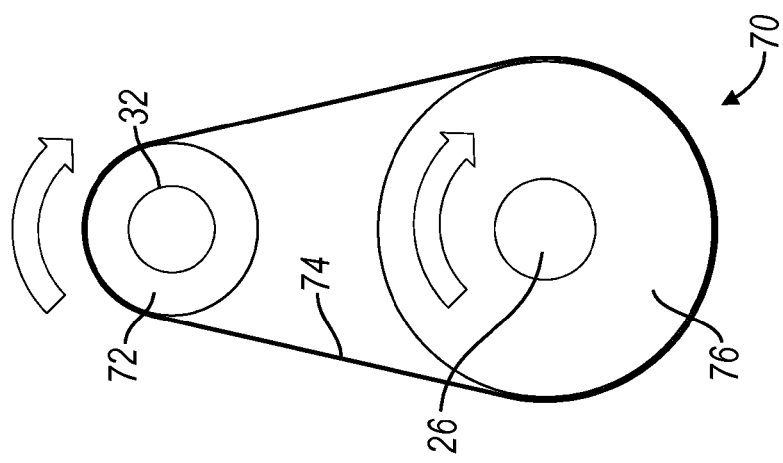

FIGS. 3A and 3B clarify this difference. In FIG. 3A, which represents the invention, it will be appreciated that there is no reversal of directional rotation between the second drive shaft 32 and the countershaft 26 through the chain sprockets 72 and 76 and the chain 74. In FIG. 3B, which represents second gear (and all the other forward gears from the standpoint of direction of rotation), the direction of rotation of the countershaft 26 is opposite from that of the second drive shaft 32, due to the power transfer through the meshing gears 82A and 82B. Although, in fact, there is a rotational direction reversal with all the forward gears, relative to the direction of the forward gears, the power transfer through the chain 74 and the sprockets 72 and 76 is opposite in direction, thereby providing reverse.

Based upon an inspection of all the drawing figures, it should be appreciated that the drive ratio in reverse between the second drive shaft 32 and the layshaft or countershaft 26 may readily be selected or changed by adjusting the effective diameters of the two sprockets 72 and 76; larger diameters of the drive sprocket 72 relative to the driven sprocket 76 will increase the speed of the countershaft 26 relative to the speed of the second drive shaft 32 and smaller diameters of the drive sprocket 72 will reduce the speed of the countershaft 26 relative to the speed of the second drive shaft 32.

It should also be appreciated that the locations of the various components of the transmission 10 such as the drive and driven gears 42A and 42B, 44A and 44B, 46A and 46B, 82A and 82B, 84A and 84B, the chain drive assembly 70, the first drive tube or quill 22, the countershaft 26, the second drive shaft 32, the input clutches 20 and 30 and the synchronizer clutches 50, 60, 90 and 100 may be adjusted or revised greatly while still maintaining the operation and invention benefits specified. For example, the second double synchronizer clutch assembly 90 and the associated splines 92 could be moved to the countershaft 26. Then the chain drive sprocket 72 and the second drive gear 82A would be secured to the second drive shaft 32 and the driven chain sprocket 76 and the second driven gear 82B would be freely rotatably disposed on the countershaft 26 and selectively coupled thereto by the second double synchronizer clutch assembly 90. Such variations and adjustments of the locations of the foregoing recited components and others are deemed to be well within the scope of the present invention and claims.

Last of all, it should be appreciated that the reverse chain drive assembly of the present invention has wide application in the motor vehicle transmission art. As noted above, in the vast majority of manual, semi-automatic and automatic transmissions including dual clutch transmissions (DCT's), planetary gear types and continuously variable transmissions (CVT's), reverse gear is achieved by the incorporation of a direction reversing idler gear. Thus, in all these applications, the present invention replaces the reverse idler gear and may be utilized to provide reverse.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A transmission for motor vehicles having a reverse chain drive comprising, in combination,
    a first and a second drive shaft,
    a first and a second friction clutch directly connected with said first and second drive shafts, respectively, for selective engagement with a prime mover,
    a driven shaft,
    five gear sets operably disposed between said first and second drive shafts and said driven shaft for providing a plurality of forward speed ratios, each of said five gear sets having a first gear rotatably supported by one of said first and second drive shafts and a second gear rotatably supported by said driven shaft,
    a first chain sprocket rotatably disposed on said first drive shaft, a second chain sprocket fixed for common rotation with said driven shaft and a chain engaging said first and said second chain sprockets,
    a first synchronizer clutch disposed between said first gear of a first of said five gear sets and said first chain sprocket and rotatably engaged to said first drive shafts, said synchronizer clutch selectively engageable for common rotation with one of said first gear of one of said five gear sets and said first chain sprocket, and
    a second synchronizer clutch disposed between said first gears of a second of said five gear sets and a third of said five gear sets, said second synchronizer clutch selectively engaging one of the first gears with the second drive shaft.

2. The transmission of claim 1 further including a housing.

3. The transmission of claim 1 further including a shift fork, a shift rail and a shift actuator associated with said synchronizer clutch.

4. The transmission of claim 1 wherein said driven shaft is parallel to and offset from said drive shafts and rotates in a direction opposite to a direction of said drive shaft when one of said plurality of gear sets is transmitting torque.

5. The transmission of claim 1 wherein said driven shaft is a countershaft and includes an output gear driving a final drive assembly and said output gear is disposed between said second gears of said second and third of said five gear sets.

6. The transmission of claim 1 wherein said drive shafts are input shafts.

7. The transmission of claim 1 wherein said second drive shaft is a quill shaft disposed concentrically with the first drive shaft, said first gear of a fourth of said five gear sets is rotatably supported by said second drive shaft, and said first gear of a fifth of said five gear sets is rotatably supported by said first drive shaft.

8. A transmission for a motor vehicle having a reverse chain drive comprising, in combination,
    an input shaft defining an input axis,
    a first drive shaft rotatable about said input axis,
    a second drive shaft disposed at least partially concentric with said first drive shaft,
    a first friction clutch selectively engageable to rotationally couple said input shaft with said first drive shaft,
    a second friction clutch selectively engageable to rotationally couple said input shaft with said second drive shaft,
    an output shaft defining and output axis,
    a plurality of meshing gear assemblies each having a first gear disposed on one of said drive shafts and a second gear disposed on said output shaft for providing forward speed ratios, said plurality of gear assemblies causing a reversal of direction between said drive shafts and said output shaft,
    a chain drive assembly having a first sprocket disposed on one of said drive shafts, a second sprocket fixed to said output shaft, a clutch for engaging one of said first gears of one of said plurality of meshing gear assemblies and said first sprocket with said one of said drive shafts and a chain connecting said sprockets.

9. The transmission of claim 8 wherein said second axis is parallel to and spaced from said first axis.

10. The transmission of claim 8 wherein said clutch is a synchronizer clutch assembly and further including an actuator, shift rail and shift fork for bi-directionally translating said synchronizer clutch.

11. The transmission of claim 8 wherein said input shaft is coupled to a prime mover.

12. The transmission of claim 8 wherein said output shaft drives a final drive assembly.

13. The transmission of claim 8 wherein said clutch is a synchronizer clutch assembly and further including an electric, hysraulic, or pneumatic shift actuator for engaging said synchronizer clutch.

14. The transmission of claim 8 wherein said chain drive assembly provides a reverse speed ratio.

15. A dual clutch transmission for a motor vehicle comprising, in combination,
    a first shaft defining a first axis,
    a second shaft defining a second, parallel axis,
    first and second drive tubes disposed about one of said shafts,
    a first friction clutch for selectively connecting said first drive tube to said one of said shafts and a second friction clutch for selectively connecting said second drive tube to said one of said shafts,
    at least one first pair of meshing gears having a first gear rotatably disposed about one of said drive tubes and a second gear coupled to one of said shafts,
    a first synchronizer clutch disposed adjacent said first gear for synchronizing and engaging said first gear with said one of said drive tubes,
    at least a second pair of meshing gears having a third gear rotatably disposed about another of said drive tubes and a fourth gear coupled to one of said shafts,
    a chain drive assembly having a first sprocket rotatably disposed about said another of said drive tubes and a second sprocket coupled to one of said shafts, and
    a second synchronizer clutch disposed between said third gear and said first sprocket for synchronizing and engaging one of said third gear and said first sprocket with said one of said shafts.

16. The dual clutch transmission of claim 15 further including a third pair of meshing gears having a fifth gear rotatably disposed about said one of said drive tubes and a sixth gear coupled to said one of said shafts, said fifth gear disposed on a side of said first synchronizer clutch opposite said first gear.

17. The transmission of claim 15 further including a housing.

18. The transmission of claim 15 further including an actuator, a shift rail and a shift fork associated with each of said synchronizer clutches.

19. The transmission of claim 15 wherein said first shaft is an input shaft and said second shaft is a countershaft.

20. The transmission of claim 15 wherein said chain drive assembly provides a reverse speed ratio.

* * * * *